(12) United States Patent
Takechi

(10) Patent No.: US 10,492,481 B2
(45) Date of Patent: Dec. 3, 2019

(54) DUAL-BEARING REEL SPOOL AND DUAL-BEARING REEL

(71) Applicant: Shimano Inc., Sakai, Osaka (JP)

(72) Inventor: Kunio Takechi, Sakai (JP)

(73) Assignee: SHIMANO INC., Sakai, Osaka (JP)

(*) Notice: Subject to any disclaimer, the term of this patent is extended or adjusted under 35 U.S.C. 154(b) by 266 days.

(21) Appl. No.: 15/642,933

(22) Filed: Jul. 6, 2017

(65) Prior Publication Data

US 2018/0092343 A1 Apr. 5, 2018

(30) Foreign Application Priority Data

Sep. 30, 2016 (JP) ................... 2016-193556

(51) Int. Cl.
*A01K 89/01* (2006.01)
*A01K 89/015* (2006.01)

(52) U.S. Cl.
CPC ...... *A01K 89/0193* (2015.05); *A01K 89/0189* (2015.05); *A01K 89/01901* (2015.05)

(58) Field of Classification Search
CPC ............ A01K 89/0193; A01K 89/0111; A01K 89/0189; A01K 89/01901
See application file for complete search history.

(56) References Cited

U.S. PATENT DOCUMENTS

| | | | | |
|---|---|---|---|---|
| 3,934,482 A | * | 1/1976 | Byers | B63B 21/56 474/9 |
| 4,549,703 A | * | 10/1985 | Atobe | A01K 89/01555 242/288 |
| 4,753,322 A | * | 6/1988 | Yasuda | B66B 15/04 187/254 |
| 5,785,266 A | * | 7/1998 | Bowersox | A01K 89/0111 242/128 |
| 6,371,448 B1 | * | 4/2002 | De Angelis | B66B 15/04 254/374 |
| 6,435,480 B1 | * | 8/2002 | Allen | B66D 1/7421 242/613.2 |
| 6,959,887 B2 | * | 11/2005 | Kawasaki | A01K 89/01931 242/322 |
| 7,188,793 B2 | * | 3/2007 | Ikuta | A01K 89/01555 188/156 |

(Continued)

FOREIGN PATENT DOCUMENTS

JP 2001286246 A 10/2001

*Primary Examiner* — Michael E Gallion
(74) *Attorney, Agent, or Firm* — United IP Counselors, LLC

(57) ABSTRACT

A spool for a dual-bearing reel is rotatably disposed in a reel body. The spool includes a bobbin trunk, a first flange and a second flange. The bobbin trunk enables a fishing line to be wound about an outer periphery thereof. Each of the first and second flanges includes an inner wall surface and an outer peripheral surface. The inner wall surface is provided on one end of the bobbin trunk. The outer peripheral surface extends axially outward from a distal end of the inner wall surface. Additionally, the distal end of the inner wall surface of the first flange has a larger outer diameter than the distal end of the inner wall surface of the second flange. The inner wall surface of the first flange and the outer peripheral surface of the first flange are connected through a smooth curved surface.

17 Claims, 5 Drawing Sheets

(56) References Cited

U.S. PATENT DOCUMENTS

| | | | | |
|---|---|---|---|---|
| 7,775,471 | B2* | 8/2010 | Kitajima | A01K 89/01931 |
| | | | | 242/322 |
| 8,066,216 | B2* | 11/2011 | Takechi | A01K 89/01908 |
| | | | | 242/246 |
| 8,113,456 | B2* | 2/2012 | Takechi | A01K 89/0192 |
| | | | | 242/257 |
| 8,485,461 | B2* | 7/2013 | Saito | A01K 89/0111 |
| | | | | 242/322 |
| 9,758,358 | B2* | 9/2017 | Mupende | B66D 1/30 |
| 10,271,529 | B2* | 4/2019 | Numata | A01K 89/01555 |
| 2004/0178398 | A1* | 9/2004 | Miller | F16H 55/44 |
| | | | | 254/390 |
| 2011/0011967 | A1* | 1/2011 | Takechi | A01K 89/01908 |
| | | | | 242/302 |
| 2015/0291403 | A1* | 10/2015 | Ervin | B66D 1/36 |
| | | | | 254/390 |
| 2016/0106083 | A1* | 4/2016 | Niitsuma | A01K 89/0192 |
| | | | | 242/310 |
| 2018/0103627 | A1* | 4/2018 | Takechi | A01K 89/0193 |
| 2018/0125049 | A1* | 5/2018 | Toake | A01K 89/01928 |

* cited by examiner

DUAL-BEARING REEL SPOOL AND DUAL-BEARING REEL

CROSS-REFERENCE TO RELATED APPLICATIONS

This application claims priority to Japanese Patent Application No. 2016-193556 filed on Sep. 30, 2016, the entirety of which is hereby incorporated by reference in its entirety.

BACKGROUND

Technical Field

The present disclosure relates to a spool for a dual-bearing reel and a dual-bearing reel including the same.

Background Art

In dual-bearing reels in which a spool is rotated when a fishing line is released, the rotational speed of the spool becomes faster than the releasing speed of the fishing line in casting or in dropping a terminal tackle into the water, whereby so-called backlash occurs, which is a phenomenon in which the fishing line sags (e.g., line sag occurs) and is tangled. As one of the means for preventing backlash, a so-called thumbing operation is well known, which is an operation of an angler applying resistance to rotation of the spool by touching a flange of the spool with the thumb so as to inhibit the rotation of the spool.

Additionally, the thumbing operation is used not only in casting but also in controlling the fishing line and dealing with movement of hooked fish after casting. Japan Laid-open Patent Application Publication No. 2001-286246 describes a thumbing assistance part provided for reliably performing the thumbing operation by preventing slippage of the thumb of an angler in pushing the thumb on a rim surface of a spool flange.

Depending on the size of a reel body, it is difficult for the rim surface of the spool flange described in Japan Laid-open Patent Application Publication No. 2001-286246 to reliably have an area on which the thumb pad can be firmly pushed. Moreover, when the fishing line is wound to the vicinity of a corner part between the spool flange and the rim surface, it is also difficult to perform the thumbing operation by firmly pushing the thumb on the corner part because of the fishing line is very proximate to the corner part.

BRIEF SUMMARY

It is an object of the present disclosure to provide a spool, on a flange of which a thumbing operation can be reliably performed, and a dual-bearing reel including the same.

A spool for a dual-bearing reel according to an aspect of the present disclosure is rotatably disposed in a reel body. The spool for a dual-bearing reel includes a bobbin trunk, a first flange and a second flange. The bobbin trunk enables a fishing line to be wound about an outer periphery thereof. Each of the first and second flanges includes an inner wall surface and an outer peripheral surface. The inner wall surface is provided on one end of the bobbin trunk. The outer peripheral surface extends axially outward from a distal end of the inner wall surface. The distal end of the inner wall surface of the first flange has a larger outer diameter than the distal end of the inner wall surface of the second flange. The inner wall surface of the first flange and the outer peripheral surface of the first flange are connected through a smooth curved surface.

In the spool for a dual-bearing reel, the distal end of the inner wall surface of the first flange has a larger outer diameter than the distal end of the inner wall surface of the second flange. Therefore, even when the fishing line is wound to an outermost diameter part of the inner wall surface of the second flange, a thumbing operation can be performed without being affected by the fishing line, while the thumb is firmly pushed on the curved surface.

The outer peripheral surface of the second flange can slant such that an outer diameter of the outer peripheral surface of the second flange gradually increases in accordance with axially outward extension of the outer peripheral surface of the second flange.

The second flange can further include a cylindrical surface that extends axially outward from an outermost diameter part of the outer peripheral surface of the second flange. In this case, when the spool is attached to the reel body, the cylindrical surface is disposed on the inner peripheral side of the reel body. Accordingly, an interval between the reel body and the spool can be accurately controlled, and the fishing line can be inhibited from getting stuck between the reel body and the spool.

The outer peripheral surface of the first flange can slant more gently than the inner wall surface of the first flange with respect to a rotational axis of the spool. In this case, the curved surface, connecting the inner wall surface and the outer peripheral surface of the first flange, is stably touched by the thumb. Therefore, a thumbing operation can be performed while the thumb is firmly pushed on the curved surface.

At least either of the outer peripheral surface of the first flange and the curved surface of the first flange can include a recognition part. The recognition part is touched by a thumb of a hand holding the reel body such that a rotational frequency of the spool can be recognized. In this case, when touched by a finger, part of the recognition part makes contact with the finger. Therefore, an angler can perform a thumbing operation while recognizing the extent of the rotational frequency (or the rotational speed) of the spool. Hence, the rotational frequency (or the rotational speed) can be minutely regulated.

The recognition part can be at least one protrusion or groove. In this case, the extent of the rotational frequency (or the rotational speed) of the spool can be easily recognized with the at least one protrusion or groove touched by a finger.

A dual-bearing reel according to an aspect of the present disclosure is capable of releasing a fishing line forward, and includes a handle, a reel body, the aforementioned spool and a clutch operating member. The reel body includes a first body part to which the handle is rotatably attached and a second body part disposed axially at an interval from the first body part. The aforementioned spool is rotatably disposed between the first body part and the second body part. The clutch operating member is pivotably provided on the reel body, and performs an operation of transmitting a rotational force and an operation of blocking the rotational force between the handle and the spool. The first flange of the aforementioned spool is disposed on the same side as the first body part.

In this case, for instance, when the clutch operating member is a clutch lever that is pivotably attached to a first flange side lateral part of the reel body such that the tip of the clutch lever extends to the first flange side, a thumbing operation can be quickly and smoothly performed after a clutch operation. Contrarily, the clutch operation can be also quickly and smoothly performed after the thumbing operation.

A dual-bearing reel according to an aspect of the present disclosure is capable of releasing a fishing line forward, and includes a handle, a reel body, the aforementioned spool and a clutch operating member. The reel body includes a first body part to which the handle is rotatably attached and a second body part disposed axially at an interval from the first body part. The aforementioned spool is rotatably disposed between the first body part and the second body part. The clutch operating member is pivotably provided on the reel body, and performs an operation of transmitting a rotational force and an operation of blocking the rotational force between the handle and the spool. The first flange of the aforementioned spool is disposed on the same side as the second body part. This construction is effective in performing the thumbing operation with higher strength.

Overall, according to the present disclosure, it is possible to provide a spool, on a flange of which a thumbing operation can be reliably performed, and a dual-bearing reel including the same.

BRIEF DESCRIPTION OF THE DRAWINGS

Referring now to the attached drawings which form a part of this original disclosure.

DETAILED DESCRIPTION OF EMBODIMENTS

Figure 1:
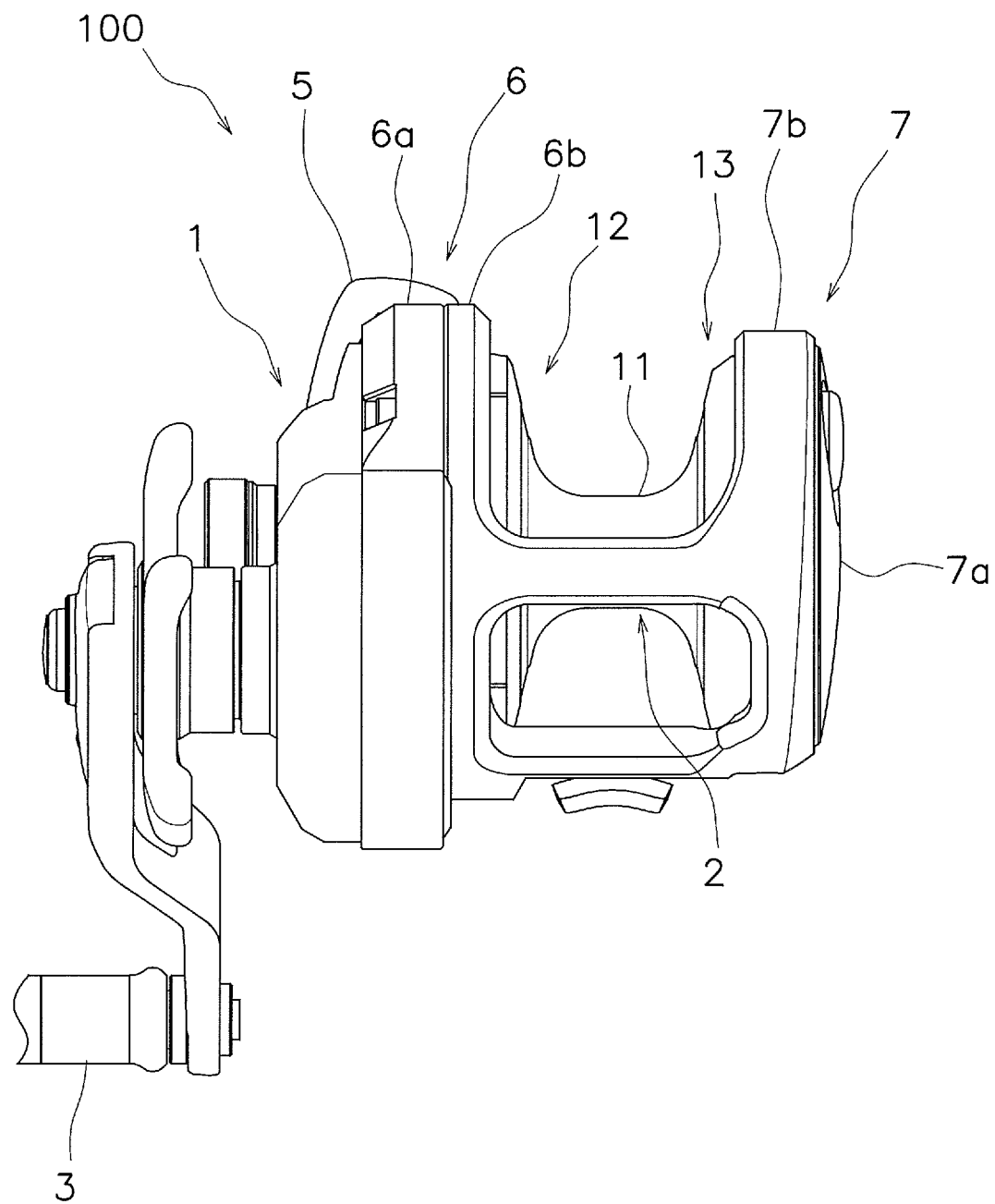
FIG. 1 is a front view of a dual-bearing reel according to the present disclosure.
Figure 2:
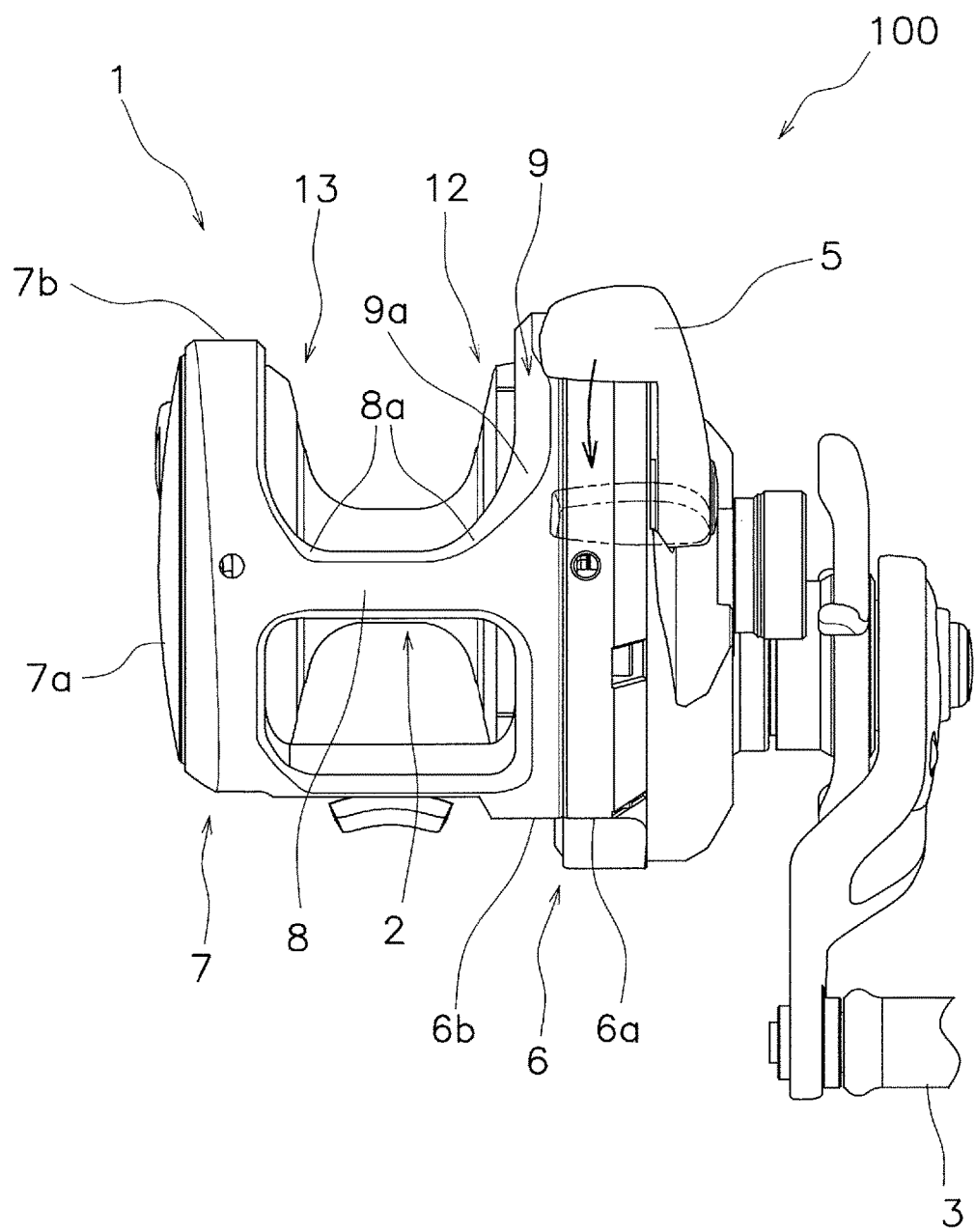
FIG. 2 is a rear view of the dual-bearing reel according to the present disclosure.

As shown in FIGS. 1 to 4, a dual-bearing reel 100 is a dual-bearing reel for releasing a fishing line forward. The dual-bearing reel 100 includes a reel body 1, a spool 2, a handle 3, a rotation transmission mechanism 4 (see FIG. 4) and a clutch lever 5. It should be noted that FIG. 1 is a view of the dual-bearing reel 100 as seen from a front side (a tip side of a fishing rod when the dual-bearing reel 100 is attached to the fishing rod), whereas FIG. 2 is a view of the dual-bearing reel 100 as seen from a rear side.

The reel body 1 includes a first body part 6, a second body part 7 and a thumb rest 8. The first body part 6 includes a first side cover 6a and a first side plate 6b. The first side cover 6a is attached to the first side plate 6b so as to cover a lateral surface of the first side plate 6b. The first side plate 6b includes a cutout part 9 recessed to the inner peripheral side. The cutout part 9 will be described below in detail.

The second body part 7 is disposed axially at an interval from the first body part 6. The second body part 7 includes a second side cover 7a and a second side plate 7b. The second side cover 7a is attached to the second side plate 7b so as to cover a lateral surface of the second side plate 7b.

The thumb rest 8 is disposed behind the reel body 1. The thumb rest 8 couples the first side cover 6a and the second side cover 7a while axially extending therebetween. The thumb rest 8 includes circular-arc surfaces 8a on both ends thereof. The circular-arc surfaces 8a take the form of curved surfaces continuing to the first side plate 6b and the second side plate 7b.

Figure 4:
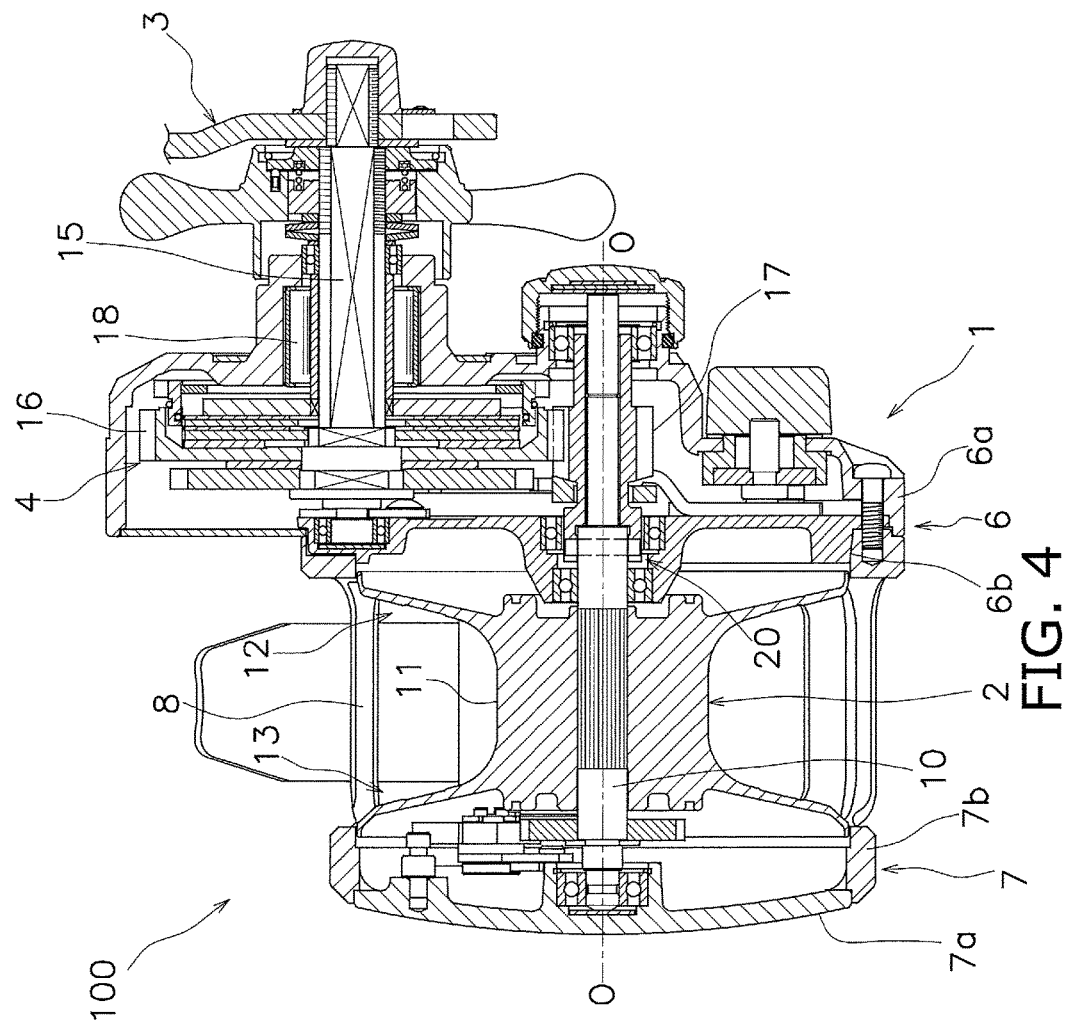
FIG. 4 is a cross-sectional view of the dual-bearing reel according to the present disclosure.

The spool 2 is rotatably disposed between the first body part 6 and the second body part 7. As shown in FIG. 4, the spool 2 is fixed to a spool shaft 10 extending between the first body part 6 and the second body part 7, and is unitarily rotated with the spool shaft 10. It should be noted that the spool shaft 10 is rotatably supported by the first and second body parts 6 and 7 through bearing members and so forth.

Figure 5:
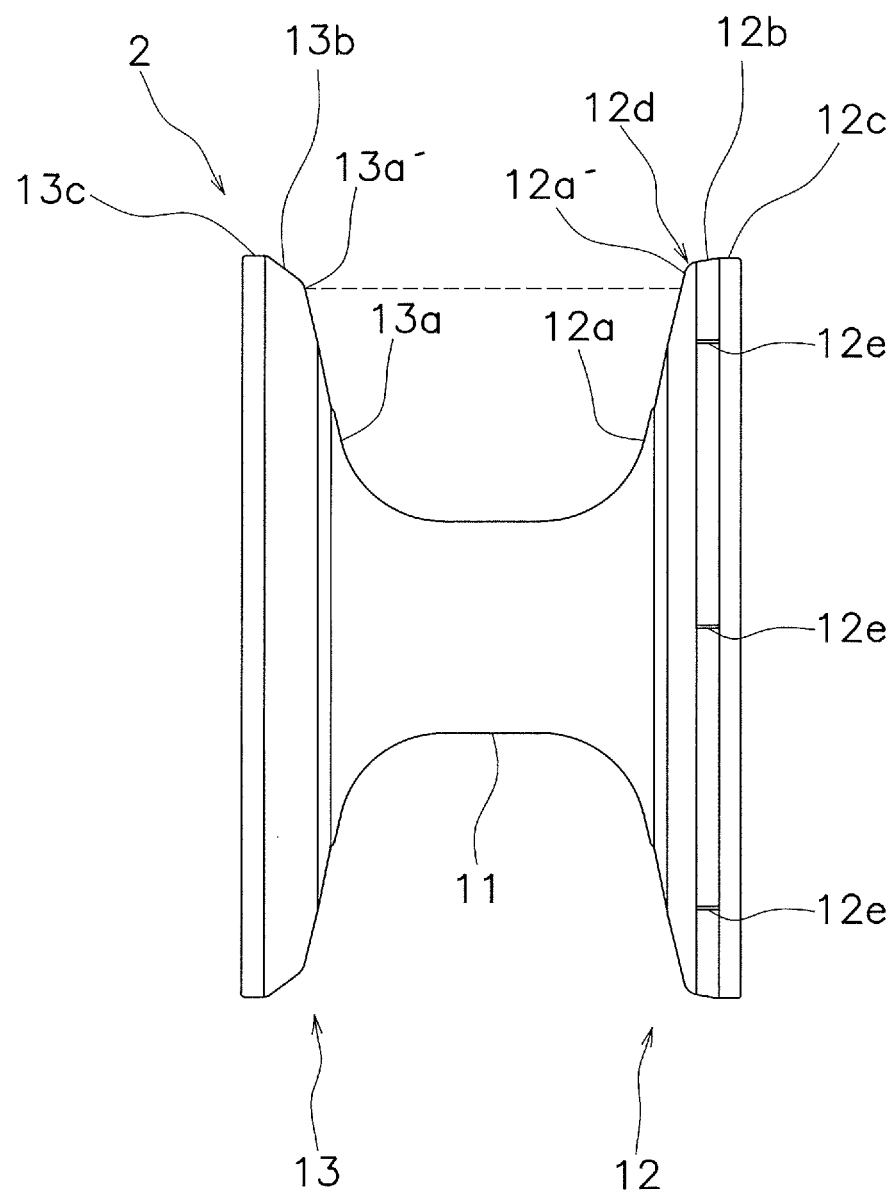
FIG. 5 is a rear view of a spool according to the present disclosure.

As shown in FIG. 5, the spool 2 includes a bobbin trunk 11 enabling the fishing line to be wound about the outer periphery thereof, a first flange 12 and a second flange 13.

The first flange 12 is provided on the first body part 6 side of the bobbin trunk 11, and has a smaller outer diameter than the first body part 6. The first flange 12 includes an inner wall surface 12a, an outer peripheral surface 12b and a cylindrical surface 12c.

The inner wall surface 12a is shaped to slant axially outside such that the outer diameter thereof gradually increases from the first body part 6-side distal end of the bobbin trunk 11 (the right side in FIG. 5).

The outer peripheral surface 12b is shaped to slant such that the outer diameter thereof gradually increases from an outermost diameter part 12a' of the inner wall surface 12a in accordance with axially outward extension of the outer peripheral surface 12b. The outer peripheral surface 12b slants more gently than the inner wall surface 12a with respect to a rotational axis O of the spool 2. Additionally, the inner wall surface 12a and the outer peripheral surface 12b are connected through a smooth curved surface 12d.

The cylindrical surface 12c is a flat surface extending axially outward from an outermost diameter part of the outer peripheral surface 12b in parallel to the spool shaft 10. When the spool 2 is attached to the reel body 1, the cylindrical surface 12c is opposed to the inner peripheral part of the first side plate 6b of the first body part 6.

When a thumbing operation is performed, the thumb of an angler is pushed on the curved surface 12d, whereby rotation of the spool 2 is inhibited. At this time, the area of the thumb contacted to the first flange 12 is more reduced than that when the thumb is pushed on the inner wall surface 12a. However, the contact of the thumb becomes stable, whereby the thumb can be firmly pushed on the curved surface 12d. Therefore, fine thumbing control is enabled by freely adjusting the magnitude of pressure per unit area to be applied to the curved surface 12d.

The outer peripheral surface 12b includes a groove(s) 12e (exemplary recognition part) by which rotation of the spool 2 is recognized. The groove(s) 12e crosses the outer peripheral surface 12b in the axial direction. The groove(s) 12e is formed by laser engraving or so forth. The number of grooves 12e can be suitably set as long as it is at least one. When a plurality of grooves 12e are formed, the number of grooves 12e is desirably set (to be approximately in a range of 2 to 8 while the grooves 12e are evenly aligned in the circumferential direction) such that the extent of the rotational speed (or the rotational frequency) of the spool 2 is easily recognizable by an angler.

When touching the curved surface 12d with the thumb of the hand holding the reel body 1 during rotation of the spool 2, an angler can feel contact stimulus by the groove(s) 12e provided on the outer peripheral surface 12b. Therefore, when the angler adjusts the magnitude of pressure per unit area to be applied to the curved surface 12d while recognizing the extent of the rotational speed (or the rotational frequency) of the spool 2, it is possible to easily obtain his/her desirable extent of the rotational speed (or the rotational frequency) of the spool 2.

The second flange 13 is provided on the second body part 7 side of the bobbin trunk 11, and has a smaller outer diameter than the second body part 7. The second flange 13 includes an inner wall surface 13a, an outer peripheral surface 13b and a cylindrical surface 13c.

The inner wall surface 13a is shaped to slant axially outside such that the outer diameter thereof gradually increases from the second body part 7-side distal end of the bobbin trunk 11 (the left side in FIG. 5). It should be noted that the inner wall surface 13a slants equally to the inner wall surface 12a of the first flange 12 with respect to the rotational axis of the spool 2.

The outer peripheral surface 13b is shaped to slant such that the outer diameter thereof gradually increases from an outermost diameter part 13a' of the inner wall surface 13a in accordance with axially outward extension of the outer peripheral surface 13b.

The cylindrical surface 13c is a flat surface flatly extending axially outward from an outermost diameter part of the outer peripheral surface 13b in parallel to the spool shaft 10. When the spool 2 is attached to the reel body 1, the cylindrical surface 13c is opposed to the inner peripheral part of the second side plate 7b of the second body part 7.

As depicted with broken line in FIG. 5, the outermost diameter part 12a' of of the inner wall surface 12a of the first flange 12 is herein shaped to have a larger outer diameter than the outermost diameter part 13a' of the inner wall surface 13a of the second flange 13. With this construction, even when the fishing line is wound to the vicinity of the outermost diameter part 13a' of the inner wall surface 13a of the second flange 13 (the height depicted with broken line), the curved surface 12d of the first flange 12 is not covered with the fishing line. Therefore, a thumbing operation can be performed while the thumb is firmly pushed on the curved surface 12d. Moreover, it is not required to push the thumb on the surface of the fishing line when a thumbing operation is performed. Hence, it is possible to prevent abrasion of the fishing line due to a thumbing operation and damage or injury of the thumb due to friction with the fishing line.

Next, the configuration of the cutout part 9 will be explained based on FIGS. 2 and 3. The cutout part 9 is formed by cutting out the first side plate 6b of the first body part 6 such that part of the outer edge of the first side plate 6b, located adjacent to the thumb rest 8, gets closer to the outer edge (the curved surface 12d) of the first flange 12 of the spool 2. Detailedly, the cutout part 9 has a shape recessed to the inner peripheral side of the first side plate 6b, and takes the form of a curved surface 9a. The curved surface 9a slants such that the outer diameter thereof reduces in accordance with proximity to the curved surface 12d of the first flange 12 of the spool 2. Additionally, the first side plate 6b-side one of the circular-arc surfaces 8a of the thumb rest 8 is shaped to smoothly continue to the curved surface 9a.

By thus configuring the cutout part 9, accessibility to the first flange 12 of the spool 2 is enhanced when a thumbing operation is performed. Additionally, the curved surface 12d of the first flange 12 is located in the vicinity of the cutout part 9. Hence, a thumbing operation can be quickly and smoothly performed. Moreover, the thumb can be put on the cutout part 9. Hence, a thumbing operation can be herein performed only by slightly moving the thumb from the cutout part 9 toward the spool 2.

The handle 3 is rotatably attached to the outer lateral surface of the first body part 6 of the reel body 1. As shown in FIG. 4, the handle 3 is attached to a drive shaft 15 protruding from the first body part 6. Rotation of the handle 3 is transmitted to the spool 2 through the rotation transmission mechanism 4.

The rotation transmission mechanism 4 is a mechanism that transmits the rotation of the handle 3 to the spool 2. The rotation transmission mechanism 4 includes the drive shaft 15, a drive gear 16 and a pinion gear 17.

The drive shaft 15 is coupled to the handle 3, and is unitarily rotated with the handle 3. It should be noted that the drive shaft 15 is prevented from rotating in a fishing line releasing direction by a one-way clutch 18.

The drive gear 16 is attached to the drive shaft 15 and is unitarily rotated with the drive shaft 15. The pinion gear 17 is meshed with the drive gear 16. The pinion gear 17 is coupled to the spool shaft 10 through a clutch mechanism 20 to be described.

Figure 3:
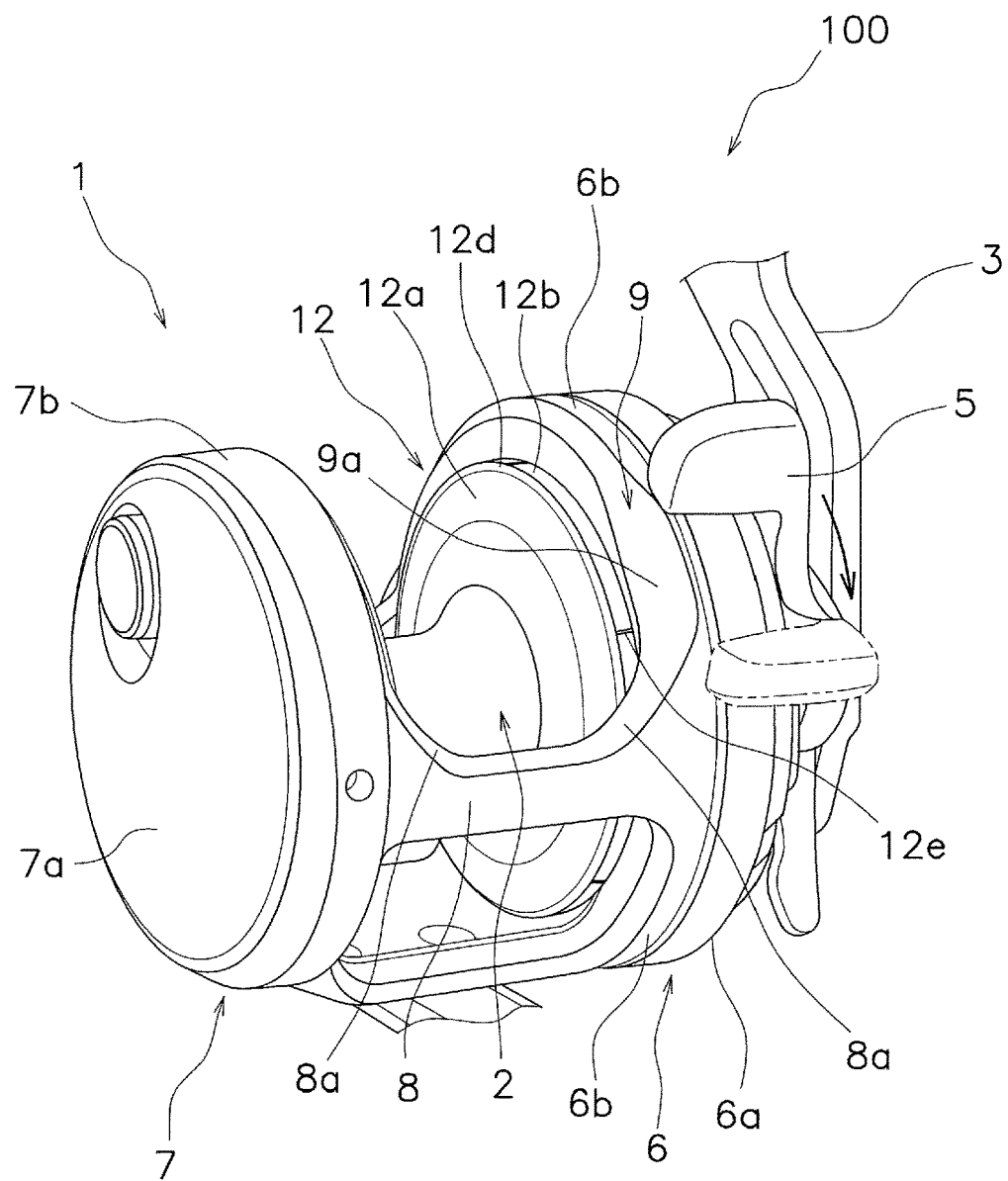
FIG. 3 is a perspective view of the dual-bearing reel according to the present disclosure.

As shown in FIGS. 2 and 3, the clutch lever 5 is provided on the outer lateral surface of the first body part 6 of the reel body 1. The tip of the clutch lever 5 extends toward the spool 2, and is located in a position adjacent to the outer periphery of the first body part 6. The clutch lever 5 is capable of pivoting circumferentially along the first body part 6 between a first position depicted with solid line (a clutch on state) and a second position depicted with dashed two-dotted line (a clutch off state).

The clutch mechanism 20 performs switching between the clutch on state and the clutch off state when the clutch lever 5 is operated. Detailedly, when the clutch mechanism 20 is in an on state (when the clutch lever 5 is in the first position), the pinion gear 17 and the spool shaft 10 are unitarily rotated. On the other hand, when the clutch mechanism 20 is in an off state (when the clutch lever 5 is in the second position), the pinion gear 17 and the spool shaft 10 become rotatable relatively to each other. The on state and the off state of the clutch mechanism 20 are switched when the pinion gear 17 is axially moved.

The cutout part 9 is herein provided in a range between the first position and the second position, that is, a range in which the clutch lever 5 is capable of pivoting. Therefore, the thumb can be moved via the cutout part 9 in transition from a clutch operation to a thumbing operation or vice versa. Hence, a moving path enabling smooth movement of the thumb is reliably obtained. Additionally, the cutout part 9 is usable as a finger rest. Hence, it is also possible to quickly perform a thumbing operation or a clutch operation with the thumb put on the cutout part 9.

Especially, only by moving the clutch lever 5 with the thumb of the hand holding the reel body 1 from the first position (the clutch on state) to the second position (the clutch off state) and then just shifting the thumb transversely (toward the spool), the thumb is guided to the cutout part 9. Then, the thumb can easily reach the curved surface 12d of the spool 2 via the cutout part 9. Accordingly, a series of motions from a clutch operation to a thumbing operation can be quickly and smoothly performed.

Other Preferred Embodiments

One preferred embodiment of the present disclosure has been explained above. However, the present disclosure is not limited to the above, and a variety of changes can be made without departing from the scope of the present disclosure.

(a) In the aforementioned preferred embodiment, only the first body part 6 is provided with the cutout part 9. Alternatively, only the second body part 7 or both of the first and second body parts 6 and 7 can be provided with the cutout part 9.

(b) In the aforementioned preferred embodiment, the outer peripheral surface 12b of the first flange 12 is provided with the groove(s) 12e as an exemplary recognition part(s). However, the outer peripheral surface 12b can be provided with, instead of the groove(s) 12e, a protrusion(s) that protrudes radially outward from the outer peripheral surface 12b or minute bumps and recesses that are formed by processing such as shot peening. Alternatively, only the curved surface 12d or both of the curved surface 12d and the outer peripheral surface 12b can be provided with the groove(s) 12e, the protrusion(s) or the minute bumps and recesses.

(c) In the aforementioned preferred embodiment, the first flange 12 is disposed on the first body part 6 side of the reel body 1, whereas the second flange 13 is disposed on the second body part 7 side of the reel body 1. However, the positions of the first and second flanges 12 and 13 can be reversed. In other words, the second flange 13 can be provided with a curved surface. At this time, the second body 13 can be further provided with a cutout part. This construction is effective in performing the thumbing operation with higher strength.

(d) In the aforementioned preferred embodiment, the inner wall surface 12a of the first flange 12 is made in the form of a slant surface and slants axially outside such that the outer diameter of the inner wall surface 12a gradually increases from one distal end of the bobbin trunk 11. However, the inner wall surface 12a can be made in the form of a vertical surface and can vertically extend radially outward from one distal end of the bobbin trunk 11. Likewise, the inner wall surface 13a of the second flange 13 can be also made in the form of a vertical surface and can vertically extend radially outward from the other distal end of the bobbin trunk 11. Alternatively, each of the inner wall surfaces 12a and 13a can be made in the combination of a slant surface and a vertical surface.

(e) In the aforementioned preferred embodiment, each of the outer peripheral surfaces 12b and 13b of the first and second flanges 12 and 13 is shaped to slant such that the outer diameter of each of the outer peripheral surfaces 12b and 13b gradually increases in accordance with axially outward extension thereof from each of the outermost diameter parts 12a' and 13a' of the inner wall surfaces 12a and 13a. However, each of the outer peripheral surfaces 12b and 13b can be made in the form of a flat surface extending axially outward from each of the outermost diameter parts 12a' and 13a' of the inner wall surfaces 12a and 13a in parallel to the spool shaft 10.

What is claimed is:

1. A spool for a dual-bearing reel, the spool rotatably disposed in a reel body, the spool comprising:
    a bobbin trunk configured such that a fishing line is wound about an outer periphery thereof; and
    a first flange and a second flange, each of the first and second flanges including an inner wall surface and an outer peripheral surface, the inner wall surface provided on one end of the bobbin trunk, the outer peripheral surface extending axially outward from a distal end of the inner wall surface, wherein
    the distal end of the inner wall surface of the first flange has a larger outer diameter than the distal end of the inner wall surface of the second flange, and
    the inner wall surface of the first flange and the outer peripheral surface of the first flange are connected through a smooth curved surface along an entire periphery of the first flange; wherein the outer peripheral surface of the second flange slants such that an outer diameter of the outer peripheral surface of the second flange gradually increases in accordance with axially outward extension of the outer peripheral surface of the second flange.

2. The spool according to claim 1, wherein the second flange further includes a cylindrical surface, the cylindrical surface extending axially outward from an outermost diameter part of the outer peripheral surface of the second flange.

3. The spool according to claim 1, wherein the outer peripheral surface of the first flange slants more gently than the inner wall surface of the first flange with respect to a rotational axis of the spool.

4. The spool according to claim 1, wherein at least either of the outer peripheral surface of the first flange and the curved surface of the first flange includes at least one protrusion or groove.

5. The spool according to claim 4, wherein the at least one protrusion or groove crosses the outer peripheral surface of the first flange in an axial direction of the bobbin trunk.

6. The spool according to claim 4, wherein the at least one protrusion or groove includes a plurality of protrusions or grooves, and the plurality of protrusions or grooves are evenly aligned in a circumferential direction of the outer peripheral surface of the first flange.

7. A dual-bearing reel configured to release a fishing line forward, the dual-bearing reel comprising:
    a handle;
    a reel body including a first body part to which the handle is rotatably attached and a second body part disposed axially at an interval from the first body part;
    a spool including
    a bobbin trunk configured such that a fishing line is wound about an outer periphery thereof; and
    a first flange and a second flange, each of the first and second flanges including an inner wall surface and an outer peripheral surface, the inner wall surface provided on one end of the bobbin trunk, the outer peripheral surface extending axially outward from a distal end of the inner wall surface, wherein the distal end of the inner wall surface of the first flange has a larger outer diameter than the distal end of the inner wall surface of the second flange, and the inner wall surface of the first flange and the outer peripheral surface of the first flange are connected through a smooth curved surface along an entire periphery of the first flange, the spool rotatably disposed between the first body part and the second body part; and
    a clutch operating member pivotably provided on the reel body, the clutch operating member for performing an operation of transmitting a rotational force and an operation of blocking the rotational force between the handle and the spool, wherein
    the first flange of the spool is disposed on the same side as the first body part; wherein the outer peripheral surface of the second flange slants such that an outer diameter of the outer peripheral surface of the second flange gradually increases in accordance with axially outward extension of the outer peripheral surface of the second flange.

8. The dual-bearing reel according to claim 7, wherein the second flange further includes a cylindrical surface, the cylindrical surface extending axially outward from an outermost diameter part of the outer peripheral surface of the second flange.

9. The dual-bearing reel according to claim 7, wherein the outer peripheral surface of the first flange slants more gently than the inner wall surface of the first flange with respect to a rotational axis of the spool.

10. The dual-bearing reel according to claim 7, wherein at least either of the outer peripheral surface of the first flange and the curved surface of the first flange includes at least one protrusion or groove.

11. The dual-bearing reel according to claim 10, wherein the at least one protrusion or groove crosses the outer peripheral surface of the first flange in an axial direction of the bobbin trunk.

12. The dual-bearing reel according to claim 10, wherein the at least one protrusion or groove includes a plurality of protrusions or grooves, and the plurality of protrusions or grooves are evenly aligned in a circumferential direction of the outer peripheral surface of the first flange.

13. A dual-bearing reel configured to release a fishing line forward, the dual-bearing reel comprising:
    a handle;
    a reel body including a first body part to which the handle is rotatably attached and a second body part disposed axially at an interval from the first body part;
    a spool including
    a bobbin trunk configured such that a fishing line is wound about an outer periphery thereof; and
    a first flange and a second flange, each of the first and second flanges including an inner wall surface and an outer peripheral surface, the inner wall surface provided on one end of the bobbin trunk, the outer peripheral surface extending axially outward from a distal end of the inner wall surface, wherein the distal end of the inner wall surface of the first flange has a larger outer diameter than the distal end of the inner wall surface of the second flange, and the inner wall surface of the first flange and the outer peripheral surface of the first flange are connected through a smooth surface curved along an entire periphery of the first flange, the spool rotatably disposed between the first body part and the second body part; and
    a clutch operating member pivotably provided on the reel body, the clutch operating member for performing an operation of transmitting a rotational force and an operation of blocking the rotational force between the handle and the spool, wherein
    the first flange of the spool is disposed on the same side as the second body part; wherein the outer peripheral surface of the second flange slants such that an outer diameter of the outer peripheral surface of the second flange gradually increases in accordance with axially outward extension of the outer peripheral surface of the second flange.

14. The dual-bearing reel according to claim 13, wherein the second flange further includes a cylindrical surface, the cylindrical surface extending axially outward from an outermost diameter part of the outer peripheral surface of the second flange.

15. The dual-bearing reel according to claim 13, wherein the outer peripheral surface of the first flange slants more gently than the inner wall surface of the first flange with respect to a rotational axis of the spool.

16. The dual-bearing reel according to claim 13, wherein at least either of the outer peripheral surface of the first flange and the curved surface of the first flange includes at least one protrusion or groove.

17. The spool according to claim 1, wherein the distal end of the inner wall surface of the second flange is an outermost end where the fishing line is wound.

\* \* \* \* \*